(12) United States Patent
Chen et al.

(10) Patent No.: US 8,750,196 B2
(45) Date of Patent: Jun. 10, 2014

(54) METHOD AND DEVICE FOR RELAY NODE ACCESS

(75) Inventors: Si Chen, Shenzhen (CN); Yincheng Zhang, Shenzhen (CN); Guanzhou Wang, Shenzhen (CN); Jian Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 300 days.

(21) Appl. No.: 13/258,350

(22) PCT Filed: Jun. 4, 2010

(86) PCT No.: PCT/CN2010/073581
§ 371 (c)(1),
(2), (4) Date: Dec. 6, 2011

(87) PCT Pub. No.: WO2010/145464
PCT Pub. Date: Dec. 23, 2010

(65) Prior Publication Data
US 2012/0092999 A1   Apr. 19, 2012

(30) Foreign Application Priority Data
Jun. 19, 2009   (CN) .......................... 2009 1 0150613

(51) Int. Cl.
*H04B 7/14*   (2006.01)

(52) U.S. Cl.
USPC ......................................................... 370/315

(58) Field of Classification Search
None
See application file for complete search history.

(56) References Cited

U.S. PATENT DOCUMENTS

| 2007/0110016 | A1 | 5/2007 | Shen et al. | |
|---|---|---|---|---|
| 2008/0013520 | A1 | 1/2008 | Liu et al. | |
| 2008/0165881 | A1 | 7/2008 | Tao et al. | |
| 2009/0003274 | A1* | 1/2009 | Kwak et al. | 370/329 |
| 2010/0118752 | A1* | 5/2010 | Suzuki et al. | 370/311 |
| 2010/0265872 | A1* | 10/2010 | Wu | 370/315 |

(Continued)

FOREIGN PATENT DOCUMENTS

| CN | 1964225 A | 5/2007 |
|---|---|---|
| CN | 101106807 A | 1/2008 |

(Continued)

OTHER PUBLICATIONS

International Search Report in international application No. PCT/CN2010/073581, mailed on Sep. 9, 2010.

(Continued)

*Primary Examiner* — Chirag Shah
*Assistant Examiner* — Amar Persaud
(74) *Attorney, Agent, or Firm* — Oppedahl Patent Law Firm LLC

(57) ABSTRACT

The present disclosure provides a method and device for Relay Node (RN) access, wherein the method comprises the following steps: a base station sends a downlink message to trigger the RN to switch from monitoring a Physical Downlink Control Channel (PDCCH) to monitoring an RN-dedicated Physical Downlink Control Channel (R-PDCCH), and the RN acquires time-frequency resources for an R-PDCCH from the base station, before or while receiving the downlink message. The present disclosure enables an RN to switch from transmitting according to indication on the PDCCH to transmitting according to indication on the R-PDCCH, i.e., the RN switches from being in a connection state as the UE to being in a connection state as an RN. The present disclosure makes less change to the existing flows, offering advantages of easy implementation, flexible configuration, etc.

10 Claims, 6 Drawing Sheets

(56) References Cited

U.S. PATENT DOCUMENTS

| | | | | |
|---|---|---|---|---|
| 2010/0281323 | A1* | 11/2010 | Wang et al. | 714/748 |
| 2012/0063386 | A1* | 3/2012 | Park et al. | 370/315 |
| 2012/0113884 | A1* | 5/2012 | Park et al. | 370/312 |

FOREIGN PATENT DOCUMENTS

| | | | |
|---|---|---|---|
| CN | 101384075 A | 3/2009 | |
| CN | 101444011 A | 5/2009 | |
| JP | 2006067608 A | 3/2006 | |
| JP | 2007143137 A | 6/2007 | |
| JP | 2007306357 A | 11/2007 | |
| JP | 2008066827 A | 3/2008 | |
| JP | 2008092196 A | 4/2008 | |
| JP | 2008118659 A | 5/2008 | |
| JP | 2009536496 A | 10/2009 | |
| WO | 2007119452 A1 | 10/2007 | |
| WO | 2007133022 A1 | 11/2007 | |
| WO | 2008084748 A1 | 7/2008 | |

OTHER PUBLICATIONS

English Translation of the Written Opinion of the International Search Authority in international application No. PCT/CN2010/073581, mailed on Sep. 9, 2010.

Technical Specification, 3rd Generation Partnership Project Feb. 26, 2009.

Resource Allocation and Downlink Control Channel Structure for Relay Backhaul Link, 3GPP TSG RAN WG1 Meeting #56bis, R1-091194, Mar. 2009.

Discussion on Backhaul Control Design for Type-1 L3 Relay, 3GPP TSG RAN WG1 Meeting #57, R1-091871, May 2009.

Control Signaling Structures for Relay Link, 3GPP TSG RAN WG1 Meeting #56, R1-090641, Feb. 2009.

Downlink control signaling for dual-layer beamforming, 3GPP TSG RAN WG1 Meeting #57, R1-091793, May 2009.

Control Channel and Data Channel Design for Relay Link in LTE-Advanced, 3GPP TSG RAN1 Meeting #55bis, R1-090153, Jan. 2009.

Supplementary European Search Report in European application No. 10788860.4, mailed on Sep. 19, 2013. (4 pages—see entire document).

"3rd Generation Partnership Project;Technical Specification Group Radio Access Network; Further Advancements for E-UTRA Physical Layer Aspects (Release 9)", 3GPP Draft; TR 36.814_130, 3rd Generation Partnership Project (3GPP), Mobile Competence Centre ; 650, Route Des Lucioles , F-06921 Sophia-Antipolis Cedex; France, no. Shenzhen, China; 20090824, Jun. 1, 2009. (46 pages—see Supplementary European Search Report in European application No. 10788860.4 for relevant pages).

ZTE: "States definition for relay node", 3GPP Draft; R2-100326 States Definition for Relay Node, 3rd Generation Partnership Project (3GPP), Mobile Competence Centre; 650, Route Des Lucioles , F-06921 Sophia-Antipolis Cedex ; France, vol. Ran WG2, no. Valencia, Spain; Jan. 18, 2010, Jan. 12, 2010. (4 pages—see Supplementary European Search Report in European application No. 10788860.4 for relevant pages).

ZTE: "Considerations on the random access procedure of relay node", 3GPP Draft; R2-093889, 3rd Generation Partnership Project (3GPP), Mobile Competence Centre , 650, Route Des Lucioles ; F-06921 Sophia-Antipolis Cedex, France, no. Los Angeles, USA; Jun. 23, 2009. (4 pages—see Supplementary European Search Report in European application No. 10788860.4 for relevant pages).

* cited by examiner

METHOD AND DEVICE FOR RELAY NODE ACCESS

TECHNICAL FIELD

The present disclosure relates to the field of an access process in a digital mobile communication system, especially relating to a method and device for Relay Node (RN) access.

BACKGROUND

In order to meet the growing demand for wide-bandwidth high-speed mobile access, Long-Term Evolution Advance (LTE-Advanced) standard is brought out by a $3^{rd}$ Generation Partnership Projects (3GPP). With regard to Long-Term Evolution (LTE), the core of LTE is maintained by the LTE-Advanced. On this basis, frequency domain and space domain are extended by a series of technologies to increase the utilization ratio of the frequency spectrum and increase the system capacity etc. One of radio relay technologies, namely the LTE-Advanced, is directed to extend cell coverage, reduce the cell that cannot by reached in communications, balance loading, transfer services in hot spots and save the transmission success rate of a User Equipment (UE). As shown in FIG. 1, some new Relay Nodes (RN) are added between an original base station (e.g. Donor-eNB) and the UE. These RNs are in radio connection with the Donor-eNB, and not in wire connection with a transmission network, wherein the radio link between the Donor-eNB and the RN is called a backhaul link, and the radio link between the RN and the UE is called an access link. Downlink data arrive at the Donor-eNB first, then are transmitted to the RN, and further transmitted to the UE via the RN. Uplink data arrive at the UE first, then are transmitted to the RN, and further transmitted to the Donor-eNB.

In order to configure resources of the backhaul link, an RN-dedicated Physical Downlink Control Channel (R-PDCCH), an RN-dedicated Physical Downlink Shared Channel (R-PDSCH) and an RN-dedicated Physical Uplink Shared Channel (R-PUSCH) are defined. Started from the OFDM symbols received from the RN, the R-PDCCH may be part of Physical Resource Blocks (PDB) in the sub-frame applied to backhaul link downlink transmission, or may be part of the OFDM symbols (as shown in FIG. 2) or all OFDM symbols in the sub-frame applied to backhaul link downlink transmission. The R-PDCCH is used for dynamically or semi-statically distributing R-PDSCH resources and R-PUSCH resources, wherein the R-PDSCH resources are used for transmitting downlink data of the backhaul link, and the R-PUSCH resources are used for transmitting uplink data of the backhaul link. The RN can monitor downlink assignment, uplink authorization and others indicated by the base station on the PDCCH, and realize transmission between the RN and the base station on a corresponding Physical Downlink Shared Channel (PDSCH) and Physical Uplink Shared Channel (PUSCH). The RN can also monitor downlink assignment, uplink authorization and others indicated by the base station on the R-PDCCH, and realize transmission between the RN and the base station on the corresponding R-PDSCH and R-PUSCH. At the same time, the RN indicates the downlink assignment, uplink authorization and others on the PDCCH, and realizes the transmission between the RN and the UE on the corresponding PDSCH and is PUSCH, so as to avoid the conflict between the transmission between the RN and the base station and the transmission between the RN and the UE.

It can be seen that the RN does not have a relay function when acquiring the downlink assignment and uplink authorization sent by the base station by monitoring the PDCCH, thus it cannot indicate the downlink assignment and uplink authorization for the UE on the PDCCH and perform communications between the RN and the UE, i.e., the UE cannot be accessed to the network via the RN. Only when acquiring the downlink assignment and uplink authorization sent by the base station by monitoring the R-PDCCH, the RN can indicate the downlink assignment and uplink authorization for the UE on the PDCCH so as to allow the UE to access the network via the RN. Therefore it is necessary to introduce a method to switch from monitoring the PDCCH to monitoring the R-PDCCH to enable the UE to access the network via the RN.

SUMMARY

The technical problem to be solved by the present disclosure is that an RN does not have a relay function when monitoring a PDCCH and cannot enable the UE to access a network. Therefore, the present disclosure provides a method and device for Relay Node (RN) access so as to switch the RN from monitoring a PDCCH to monitoring an R-PDCCH, to enable the UE to access the network via the RN and realize communications between the base station and the RN, and between the RN and the UE.

In order to solve the aforementioned technical problem, the present disclosure provides a method for RN access, which comprises:

a base station sends a downlink message to trigger an RN to switch from monitoring a Physical Downlink Control Channel (PDCCH) to monitoring an RN-dedicated Physical Downlink Control Channel (R-PDCCH); and the RN acquires time-frequency resources for the R-PDCCH from the base station, before or while receiving the downlink message.

The RN may be in a connection state as a user equipment (UE) when monitoring the PDCCH; wherein the RN has part of the functions or all functions of the UE in a connection state, but does not have a relay function to perform data transmission is between the RN and the base station, and between the RN and the UE managed by the RN; and the RN may be in a connection state as an RN when monitoring the R-PDCCH; at the moment, the RN has a relay function to perform data transmission between the RN and the base station, and between the RN and the UE managed by the RN.

The method may further comprise: before the base station sends the downlink message to the RN, the base station identifies the RN by static configuration, or by receiving special signaling including an RN identification sent by the RN, or by a Media Access Control (MAC) control element including an RN identification sent by the RN.

The special signaling including the RN identification may be: a Radio Resource Control (RRC) connection setup request message, an RRC connection setup complete message, an RRC connection reestablishment request message, an RRC connection reestablishment complete message, an RRC connection reconfiguration complete message, or newly-introduced special signaling; and the MAC control element including the RN identification may be: a cell-radio network temporary identification MAC control element or a newly-introduced MAC control element.

The downlink message may be special signaling including RN-dedicated configuration information, or an MAC control element including RN-dedicated configuration information.

The special signaling including the RN-dedicated configuration information may be an RRC connection reconfiguration message or newly-introduced special signaling; and
the MAC control element including the RN-dedicated configuration information may be a newly-introduced MAC control element.

The RN-dedicated configuration information may comprise the time-frequency resources for the R-PDCCH;
the step that the RN acquires the time-frequency resources for the R-PDCCH from is the base station may comprise: the RN acquires the time-frequency resources for the R-PDCCH from the received downlink message.

After the step that the RN acquires the time-frequency resources for the R-PDCCH from the base station, the method may further comprise: the RN immediately starts to monitor the R-PDCCH.

The RN-dedicated configuration information may further comprise: switching time of switching from monitoring the PDCCH to monitoring the R-PDCCH;
the method may further comprise: the RN acquires the switching time from the received downlink message and switches from monitoring the PDCCH to monitoring the R-PDCCH according to the switching time.

The switching time may be a system frame number and/or sub-frame number from which the RN starts to monitor the R-PDCCH, or the switching time may be a time interval from the moment when the downlink message is correctly received to the moment when the RN starts to monitor the R-PDCCH.

The step of switching from monitoring the PDCCH to monitoring the R-PDCCH according to the switching time may comprise:
when the downlink message is the special signaling, the RN starts to monitor the R-PDCCH from the system frame number and/or sub-frame number; and
when the downlink message is the MAC control element, the RN starts to monitor the R-PDCCH from the system frame number and/or sub-frame number, or determines the time to start to monitor the R-PDCCH according to the moment of the RN notifying the base station that the MAC control element is received successfully and the time interval.

In order to solve the aforementioned technical problem, the present disclosure further provides an RN, which comprises a message receiving module, a time-frequency resources acquiring module and a switching module;
the message receiving module is configured to receive a downlink message sent by a base station and trigger the switching module;
the time-frequency resources acquiring module is configured to acquire time-frequency resources for an R-PDCCH from the base station; and
the switching module is configured to switch the RN from monitoring a PDCCH to monitoring the R-PDCCH.

The time-frequency resources acquiring module may be configured to acquire the time-frequency resources for the R-PDCCH from the downlink message.

The switching module may be configured to start to monitor the R-PDCCH as soon as the time-frequency resources acquiring module acquires the time-frequency resources, or acquire the switching time from the downlink message and switch the RN from monitoring the PDCCH to monitoring the R-PDCCH according to the switching time.

In the method and device for RN access provided by the present disclosure, the RN is switched from monitoring the PDCCH to monitoring the R-PDCCH, which enable the RN to switch from performing the transmitting in accordance with indications on the PDCCH to performing the transmitting in accordance with indications on the R-PDCCH, that is, the RN can be switched from a connection state as UE to a connection state as an RN. The method makes less change to the existing flows with offering advantages of easy implementation, flexible configuration, etc.

DETAILED DESCRIPTION

Figure 1:
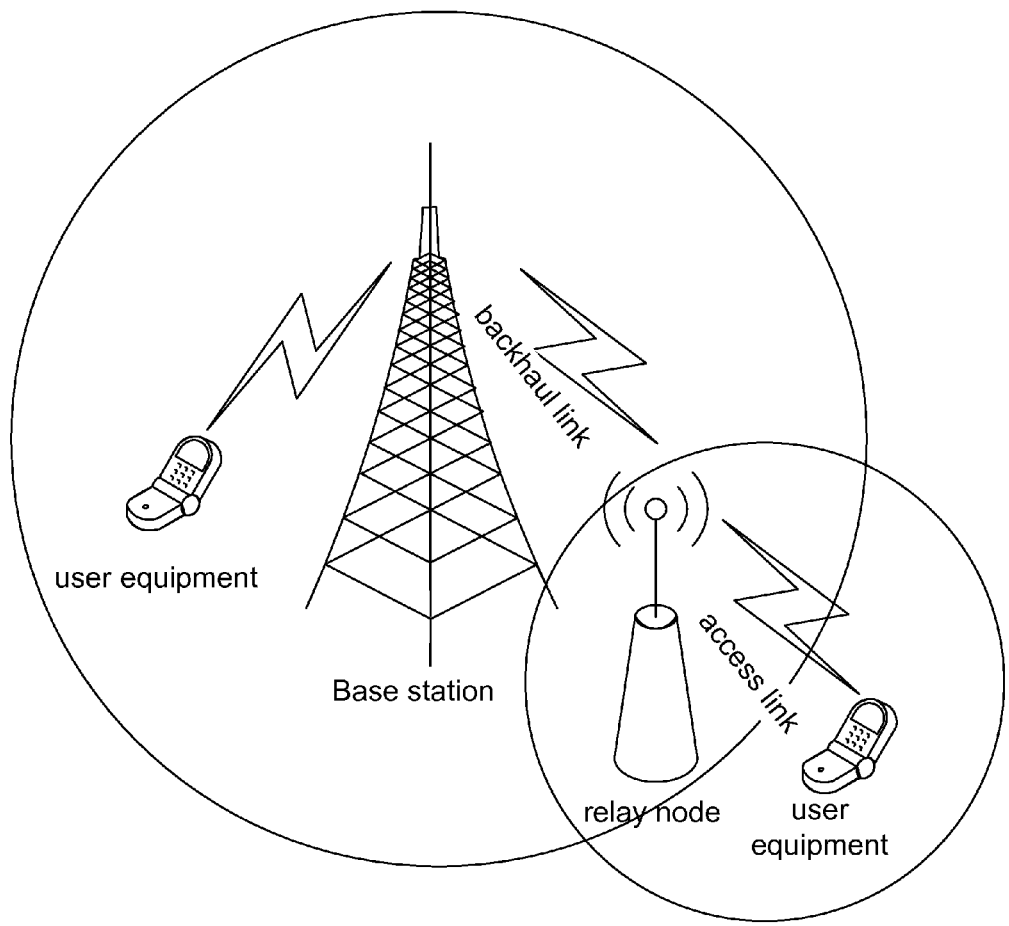
FIG. 1 shows a structure scheme illustrating a network using a radio relay technology.
Figure 2:
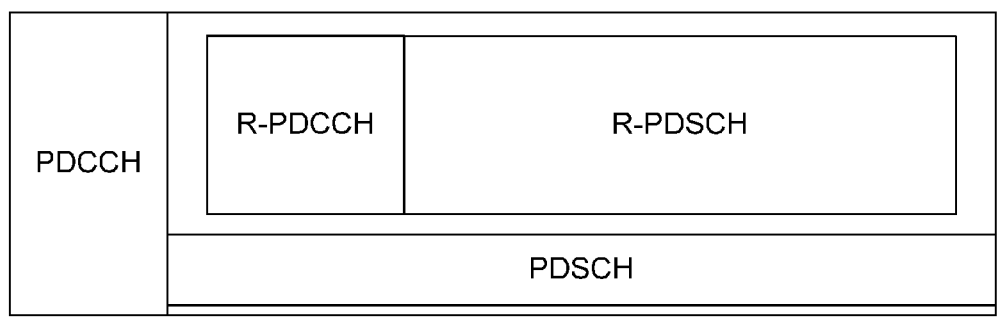
FIG. 2 shows a frame structure scheme of a sub-frame used for backhaul link downlink transmission.

The status during an RN access process in the present disclosure comprises:
(1) The RN is in an idle state: it comprises the idle state of the RN at the moment of the original power-up, and the idle state of the RN after the radio link reestablishment failure; at the moment, the RN has all functions or part of the functions as same as the UE in an idle state, such as acquiring system information, measurement and cell selection/reselection, etc.
(2) The RN is in a connection state as a UE: at the moment, the RN has all functions or part of the functions as same as the UE in a connection state, such as acquiring system information, measuring and reporting, switching, and transmitting data between the base station and the RN via a PDCCH and a PDSCH/PUSCH, etc.; at the moment, the RN does not have a relay function, i.e., the RN cannot enable the UE to access a network; the RN can be switched from a connection state as the UE to an idle state through an RRC connection and release process.
(3) The RN is in a connection state as an RN: in this state, the RN has a relay function, i.e., the RN has the relay function to perform data transmission between the RN and the base station, and between the RN and the UE managed by the RN; specifically, the RN not only has functions, such as acquiring system information, measuring and reporting, switching, and transmitting data between the base station and the RN via an R-PDCCH and an R-PDSCH/R-PUSCH, but also has functions of managing a cell is belonging to the RN, such as sending system information of the RN, managing the UE belonging to the RN, managing the measuring process of the UE, managing the switching process of the UE, and transmitting data between the RN and the UE via the PDCCH and the PDSCH/PUSCH, etc.

In the aforementioned states, the RN is switched from an idle state to a connection state as the UE by the RRC connection setup process as same as the RRC connection setup process of a common UE except that the RN may have to inform the base station that it is an RN in this process. The present disclosure solves the problem of how to switch the RN from a connection state as UE to a connection state as an RN.

The RN in the present disclosure comprises a message receiving module, a time-frequency resources acquiring module and a switching module; wherein the message receiving module is configured to receive a downlink message sent by a base station and trigger the switching module;

the time-frequency resources acquiring module is configured to acquire time-frequency resources for an R-PDCCH from the base station; and the switching module is configured to switch the RN from monitoring a PDCCH to monitoring the R-PDCCH, wherein the time-frequency resources acquiring module acquires the time-frequency resources for the R-PDCCH from the downlink message. The switching module acquires the switching time from the downlink message and switches the RN from monitoring the PDCCH to monitoring the R-PDCCH according to the switching time.

In the present disclosure, the base station sends a downlink message to trigger the RN to switch from monitoring to PDCCH to monitoring an R-PDCCH. The RN acquires the time-frequency resources for the R-PDCCH from the base station and the RN is switched from monitoring the PDCCH to monitoring the R-PDCCH.

The RN is in a connection state as the UE when monitoring the PDCCH. At the moment, the RN has all functions or part of the functions of the UE in a connection state, such as acquiring system information, measuring and reporting, switching, and is transmitting data between the base station and the RN via the PDCCH and the PDSCH/PUSCH, etc.; at the moment, the RN does not have a relay function, i.e., the RN cannot enable the UE to access the network; the RN can be switched from a connection state as the UE to an idle state through an RRC connection and release process;

The RN is in a connection state as an RN when monitoring the R-PDCCH. At the moment, the RN has a relay function, i.e., the RN has the relay function to perform data transmission between the RN and the base station, and between the RN and the UE managed by the RN; specifically, the RN not only has functions, such as acquiring system information, measuring and reporting, switching, and transmitting data between the base station and the RN via the R-PDCCH and the R-PDSCH/R-PUSCH, but also has functions of managing a cell belonging to the RN, such as sending system information of the RN, managing the UE belonging to the RN, managing the measuring process of the UE, managing the switching process of the UE, and transmitting data between the RN and the UE via the PDCCH and the PDSCH/PUSCH, etc.

Before the base station sends the downlink message to the RN, the base station identifies the RN by static configuration, or by receiving special signaling including an RN identification sent by the RN, or by a media access control (MAC) control element including an RN identification sent by the RN.

Further, the special signaling is formed by adding a field indicating the RN identification information to current UE-dedicated signaling, or by introducing new RN-dedicated signaling; wherein the current UE-dedicated signaling comprises: an RRC connection request message, or an RRC connection setup complete message, or an RRC connection reestablishment request message, or an RRC connection reestablishment complete message, or an RRC connection reconfiguration complete message; the RN-dedicated signaling is similar to the RRC connection request message, or the RRC connection setup complete message, or the RRC connection reestablishment request message, or the RRC connection reestablishment complete message, or the RRC connection reconfiguration complete message, etc, in which is identification information of the RN is included.

Further, the MAC control element is an RN-dedicated value included in an information field of the current MAC control element or a newly-introduced MAC control element; wherein the current MAC control element comprises a Cell-Radio Network Temporary Identification (C-RNTI) MAC control element, etc. The newly-introduced MAC control element is similar to the C-RNTI MAC control element, etc, in which identification information of the RN is included.

The downlink message is special signaling or a random access response message in a non-competition-based random access, or an MAC control element.

Further, the special signaling is an RN-dedicated signaling cell included in current UE-dedicated signaling, an RN-dedicated value included in a signaling cell in the current UE-dedicated signaling, or newly-introduced RN-dedicated signaling; wherein the current UE-dedicated signaling comprises an RRC connection reconfiguration message, etc., and the newly-introduced RN-dedicated signaling is similar to the RRC connection reconfiguration message, etc.

Further, an RN-dedicated information field is included in the random access response message, or an RN-dedicated value is included in the information field in the current random access response message to be distinguished with corresponding random access messages of other purposes.

Specifically, the RN-dedicated information field can be an RN indicating bit, or other RN-dedicated information fields, such as the switching time for switching from monitoring the PDCCH to monitoring the R-PDCCH. The RN-dedicated value included in the information field of the current random access response message comprises an RN-dedicated Random Access Preamble Identification (RAPID), specific R-PUSCH resource information in uplink authorization information, etc.

Further, the MAC control element is a newly-introduced MAC control element.

The method for the RN to acquire time-frequency resources for the R-PDCCH from the base station, before or while receiving the downlink message comprises acquiring time-frequency resources for the R-PDCCH from received system information, special signaling, or an MAC control element.

Further, the downlink message may transmit the time-frequency resources for the R-PDCCH.

Further, the system information is formed by adding a field indicating the time-frequency resources for the R-PDCCH to a current system information block, or introducing a new system information block; wherein the new system information block is similar to the system information block 2, etc., in which the time-frequency resources for the R-PDCCH are included.

Further, the special signaling is formed by adding a field indicating the time-frequency resources for the R-PDCCH to the current UE-dedicated signaling, or by introducing new RN-dedicated signaling; wherein the current UE-dedicated signaling comprises an RRC connection reconfiguration message, etc., and the RN-dedicated signaling is similar to the RRC connection reconfiguration message, etc., in which the time-frequency resources for the R-PDCCH are included.

Further, the MAC control element is a newly-introduced MAC control element; wherein the time-frequency resources for the R-PDCCH are included in the newly-introduced MAC control element.

Further, the RN may acquire switching time for switching from monitoring the PDCCH to monitoring the R-PDCCH from the base station before or while receiving the downlink message, the acquisition method comprises acquiring the switching time from received system information, special signaling, a random access response message in non-competition-based random access, or an MAC control element.

Further, the switching time may be a system frame number and/or sub-frame number from which the RN starts to monitor the R-PDCCH, or the switching time may be a time interval from the moment when the downlink message is correctly received to the moment when the RN starts to monitor the R-PDCCH, specifically, the switching time acquired from the system information can only be the time interval.

Further, the system information is formed by adding a field indicating the switching is time to a current system information block, or introducing a new system information block for transmitting the switching time; wherein the new system information block is similar to system information block 2, etc., in which the switching time is included.

Further, the special signaling is formed by adding a field indicating the switching time to the current UE-dedicated signaling, or by introducing new RN-dedicated signaling; wherein the current UE-dedicated signaling comprises an RRC connection reconfiguration message, etc., and the RN-dedicated signaling is similar to the RRC connection reconfiguration message, etc., in which the switching time is included.

Further, the random access response message is formed by adding a field indicating the switching time to a current random access response message.

Further, the MAC control element is a newly-introduced MAC control element for transmitting the switching time.

The implementation method for the RN to acquire the moment when to start to monitor the R-PDCCH comprises:

When the downlink message is the special signaling, if the RN has not acquired the switching time by the aforementioned method, the RN immediately starts to monitor the R-PDCCH; the process that the RN immediately starts to monitor the R-PDCCH comprises: the RN starts to monitor the R-PDCCH as soon as possible according to the processing ability of the RN; if the RN acquires the switching time by the aforementioned method, the RN starts to monitor the R-PDCCH from the system frame number and/or sub-frame number, wherein the downlink message can transmit the switching time.

When the downlink message is the random access response message, if the RN has not acquired the switching time by the aforementioned method, and if the random access response message includes the uplink authorization message of the R-PUSCH, the RN starts to monitor the R-PDCCH in predetermined time after the transmission of the R-PUSCH; the predetermined time is the time predetermined by the RN and the base station and determined by the processing ability of the RN and the time of avoiding is conflict; if the random access response message does not include the uplink authorization message of the R-PUSCH, the RN immediately starts to monitor the R-PDCCH; if the RN acquires the switching time by the aforementioned method, the RN starts to monitor the R-PDCCH from the system frame number and/or sub-frame number, wherein the downlink message can transmit the switching time.

When the downlink message is the MAC control element and if the RN has not acquired the switching time by the aforementioned method, the RN immediately starts to monitor the R-PDCCH; if the RN acquires the switching time by the aforementioned method, the RN starts to monitor the R-PDCCH from the system frame number and/or sub-frame number, or determines the time to start to monitor the R-PDCCH according to the moment of the RN notifying the base station that the MAC control element is received successfully and the time interval.

The present disclosure will be described in details hereinafter with reference to the drawings and specific embodiments.

Embodiment 1

Figure 3:
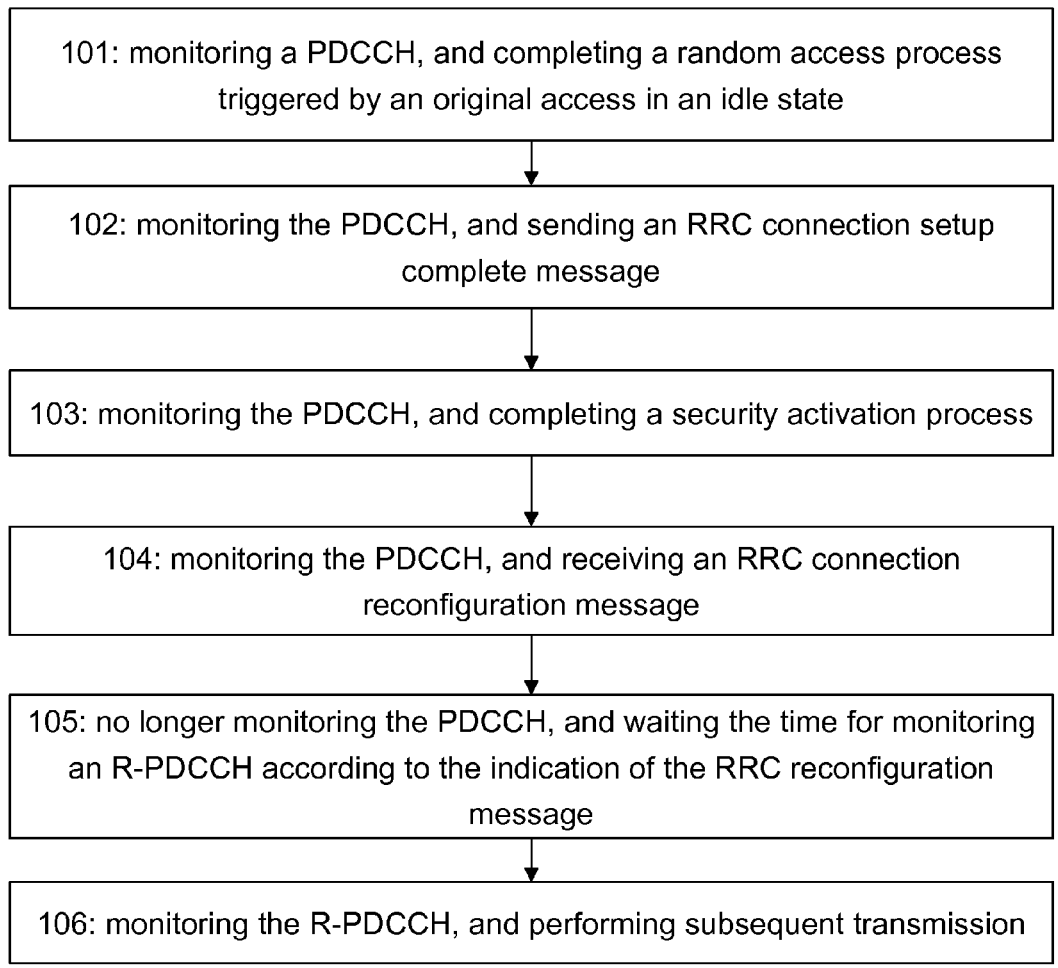
FIG. 3 shows a schematic diagram illustrating Embodiment 1 of the present disclosure.

After an RRC connection setup process is completed by monitoring the PDCCH, the RN continues monitoring the PDCCH and performs corresponding uplink and downlink transmission. When receiving an RRC connection reconfiguration message, the RN acquires time-frequency resources for the R-PDCCH and the switching time, starts to monitor a system frame number and/or sub-frame number of the R-PDCCH, is triggered to switch from monitoring the PDCCH to monitoring the R-PDCCH, starts to monitor the R-PDCCH from the predetermined switching time and performs the corresponding uplink and downlink transmission. Taking FIG. 3 as an example, the process of the RN being switched from monitoring the PDCCH to monitoring the R-PDCCH is completed by the following steps:

step 101: the RN monitors the PDCCH and completes a random access process triggered by an original access in an idle state; the RN is switched to a connection state as a UE; and go to step 102;

in the random access process, the RN informs the base station that it is an RN itself is by an RRC connection setup request message or an RRC connection setup complete message;

step 102: the RN is in a connection state as UE, and the RN monitors the PDCCH and sends the RRC connection setup complete message on the PUSCH according to C-RNTI indication on the PDCCH; and go to step 103;

step 103: the RN monitors the PDCCH and completes a security activation process; and go to step 104;

step 104: the RN monitors the PDCCH and receives the RRC connection reconfiguration message on the PDSCH according to the C-RNTI indication on the PDCCH, wherein the RRC connection reconfiguration message includes the time-frequency resources for the R-PDCCH and the system frame number and/or sub-frame number of starting to monitor the R-PDCCH; and go to step 105;

step 105: the RN no longer monitors the PDCCH, and the RN switches to a connection state as an RN when the time for monitoring the R-PDCCH arrives; and go to step 106;

step 106: the RN is in a connection state as an RN, and the RN monitors the R-PDCCH and performs transmission on the R-PUSCH or on the R-PDSCH according to the C-RNTI indication on the R-PDCCH.

In steps 101-105, corresponding to the receiving and sending of the RN, the base station sends the downlink assignment or uplink authorization etc. to the RN on the PDCCH and performs communication with the RN on the PDSCH/PUSCH; in step 106, the base station sends the downlink assignment or uplink authorization etc. to the RN on the R-PDCCH and performs communication with the RN on the R-PDSCH/R-PUSCH.

Embodiment 2

Figure 4:
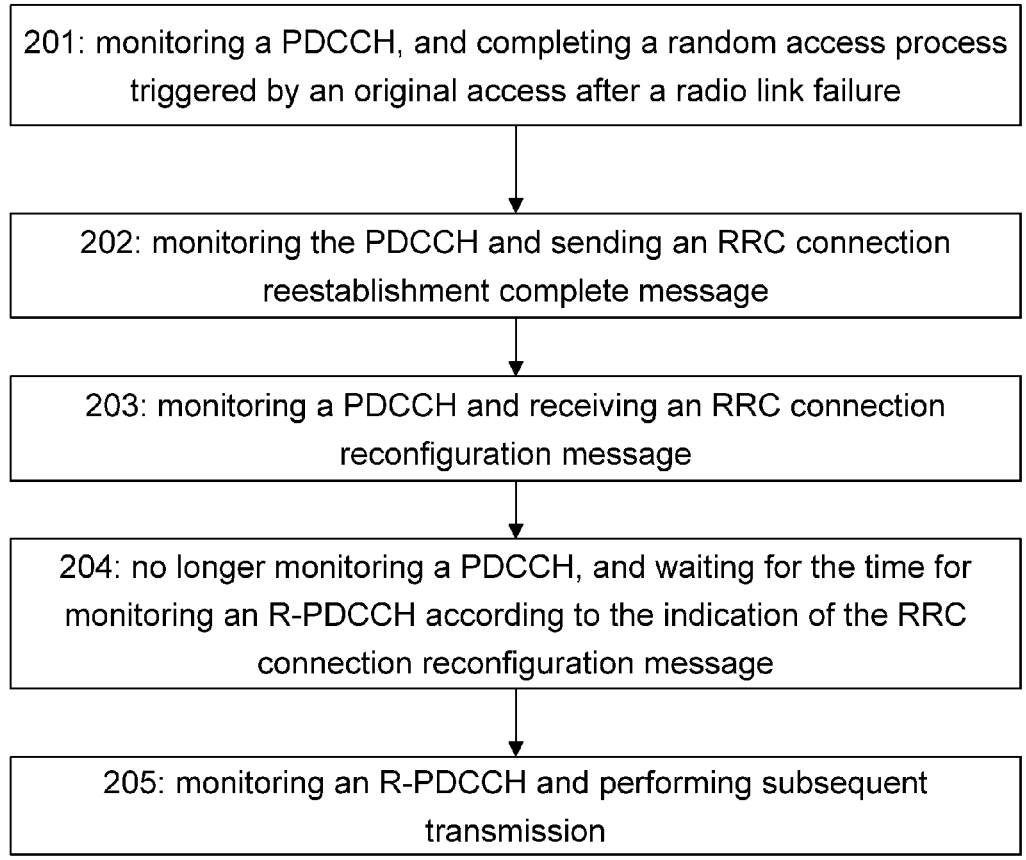
FIG. 4 shows a schematic diagram illustrating Embodiment 2 of the present disclosure.

After an RRC connection reestablishment process is completed by monitoring the PDCCH, the RN continues monitoring the PDCCH and performs corresponding uplink and downlink transmission. When receiving an RRC connection reconfiguration message, the RN acquires time-frequency resources for the R-PDCCH and switching is time, starts to monitor a system frame number and/or sub-frame number of the R-PDCCH, is triggered to switch from monitoring the PDCCH to monitoring the R-PDCCH, starts to monitor the R-PDCCH from the predetermined switching time and performs the corresponding uplink and downlink transmission. Taking FIG. 4 as an example, the process of the RN being switched from monitoring the PDCCH to monitoring the R-PDCCH is completed by the following steps:

step 201: the RN is in a connection state as UE, and the RN monitors the PDCCH and completes a random access process triggered by an original access after a radio link failure; and go to step 202;

in the random access process, the RN informs the base station that it is an RN itself by an RRC connection reestablishment request message or an RRC connection reestablishment complete message;

step 202: the RN monitors the PDCCH and sends the RRC connection reestablishment complete message on the PUSCH according to C-RNTI indication on the PDCCH; and go to step 203;

step 203: the RN monitors the PDCCH and receives the RRC connection reconfiguration message on the PUSCH according to the C-RNTI indication on the PDCCH, wherein the RRC connection reconfiguration message includes the time-frequency resources for the R-PDCCH and the system frame number and/or sub-frame number of starting to monitor the R-PDCCH; and go to step 204;

step 204: the RN no longer monitors the PDCCH, and the RN switches to a connection state as an RN when the time for monitoring the R-PDCCH arrives; and go to step 205;

step 205: the RN is in a connection state as an RN, and the RN monitors the R-PDCCH and performs transmission on the R-PUSCH or on the R-PDSCH according to C-RNTI indication on the R-PDCCH.

In steps 201-204, corresponding to the receiving and sending of the RN, the base station sends the downlink assignment or uplink authorization etc. to the RN on the is PDCCH and performs communication with the RN on the PDSCH/PUSCH; in step 205, the base station sends the downlink assignment or uplink authorization etc. to the RN on the R-PDCCH and performs communication with the RN on the R-PDSCH/R-PUSCH.

In Embodiment 1 and Embodiment 2, the special signaling to trigger the RN to monitor the R-PDCCH may be the RRC connection reconfiguration message, or other current special signaling, or newly-introduced special signaling;

in Embodiment 1 and Embodiment 2, the special signaling to trigger the RN to monitor the R-PDCCH may be the same as or different from the special signaling for transmitting the time-frequency resources for the R-PDCCH;

in Embodiment 1 and Embodiment 2, the special signaling to trigger the RN to monitor the R-PDCCH may be the same as or different from the special signaling for transmitting the switching time;

in Embodiment 1 and Embodiment 2, the time-frequency resources for the R-PDCCH can be transmitted by the special signaling, or by the MAC control element, or by system information. If the method for acquiring the time-frequency resources for the R-PDCCH is different from the special signaling to trigger the RN to monitor the R-PDCCH, the RN has received the time-frequency resources for the R-PDCCH before receiving the special signaling.

In Embodiment 1 and Embodiment 2, the switching time can be transmitted by the special signaling, or by an MAC control element. If the method for acquiring the switching time is different from the special signaling to trigger the RN to monitor the R-PDCCH, the RN has received the switching time before receiving the special signaling.

In Embodiment 1 and Embodiment 2, the switching time is not indispensable. If there is no switching time, the RN starts to monitor the R-PDCCH immediately after receiving the RRC connection reconfiguration message.

Embodiment 3

Figure 5:
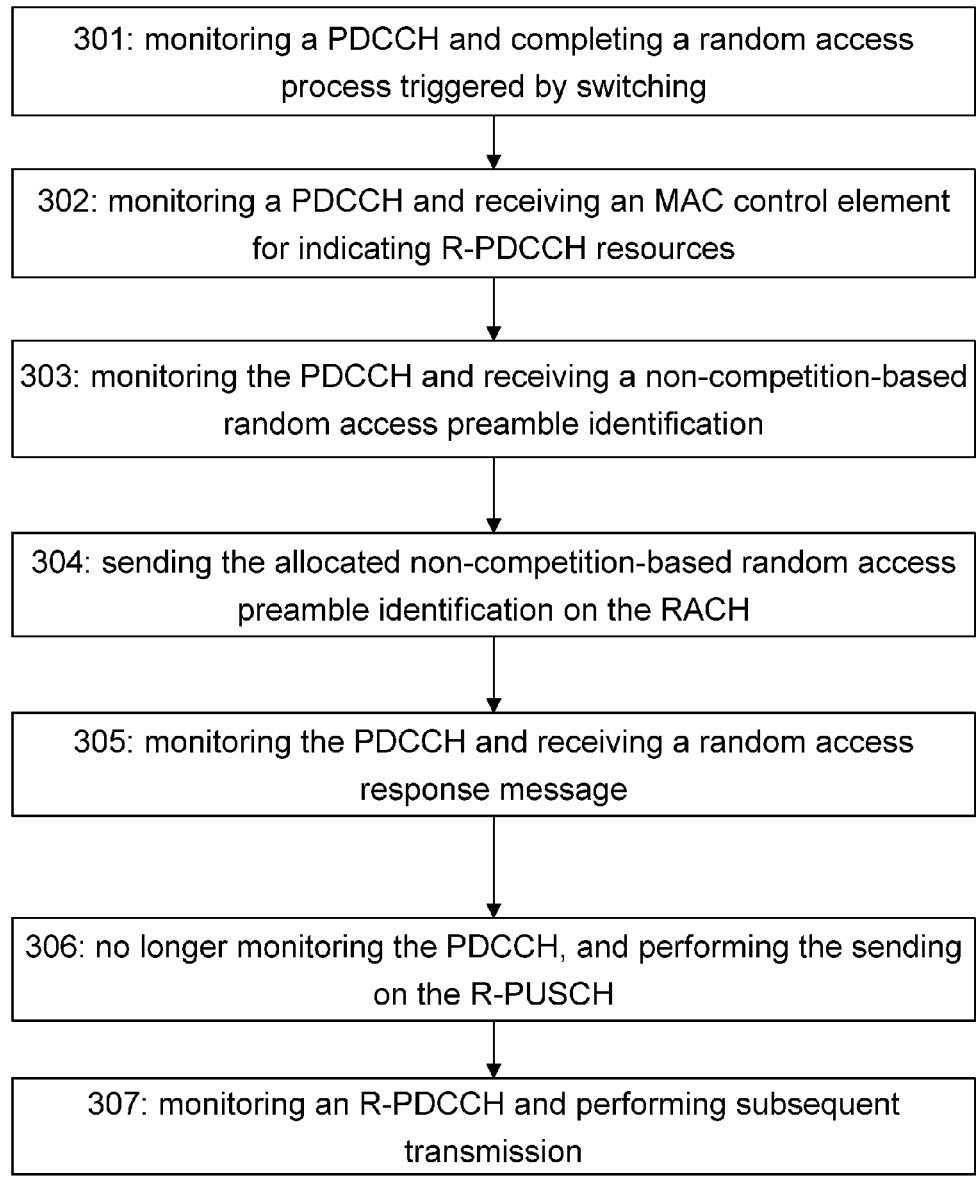
FIG. 5 shows a schematic diagram illustrating Embodiment 3 of the present disclosure.

After a random access process triggered by switching is completed by monitoring is the PDCCH, the RN continues monitoring the PDCCH and performs corresponding uplink and downlink transmission. The RN acquires time-frequency resources for the R-PDCCH according to a received MAC control element. The RN received a non-competition-based random access preamble allocated to the RN and starts the non-competition-based random access process. When the RN receives a random access response message, the random access response message includes uplink authorization information on the R-PUSCH, the RN is triggered to switch from monitoring the PDCCH to monitoring the R-PDCCH. The RN starts to monitor the R-PDCCH from predetermined time after the transmission of the R-PUSCH and performs corresponding uplink and downlink transmission. The predetermined time is the time predetermined by the RN and the base station and determined by the processing ability of the RN and the time of avoiding conflict; taking FIG. 5 as an example, the process of the RN being switched from monitoring the PDCCH to monitoring the R-PDCCH is completed by the following steps:

step 301: the RN is in a connection state as a UE, and the RN monitors the PDCCH and completes a random access process triggered by switching; go to step 302;

in the random access process, the RN informs the base station that it is an RN itself by the MAC control element;

step 302: the RN monitors the PDCCH, receives an MAC PDU transmitted on the PDSCH according to C-RNTI indication on the PDCCH, and acquires the MAC control element indicating the time-frequency resources for the R-PDSCH; and go to step 303;

step 303: the RN monitors the PDCCH, receives a non-competition-based random access preamble identification, and starts the non-competition-based random access; and go to step 304;

step 304: the RN sends the allocated non-competition-based random access preamble identification on the uplink by a Random Access Channel (RACH); and go to step 305;

step 305: the RN monitors the PDCCH and receives the random access response is message transmitted on the PDSCH according to Random Access-Radio Network Temporary Identification (RA-RNTI) indication on the PDCCH, wherein the message includes uplink authorization on the R-PUSCH, and the RN is switched to a connection state as an RN; and go to step 306;

step 306: the RN is in a connection state as an RN and sends data or signaling on the R-PUSCH; and go to step 307;

step 307: the RN monitors the R-PDCCH and performs communication on the R-PDCCH or the R-PDSCH according to the C-RNTI indication on the R-PDCCH.

In steps 301-305, corresponding to the receiving and sending of the RN, the base station sends the downlink assignment or uplink authorization etc. to the RN on the PDCCH and performs communication with the RN on the PDSCH/PUSCH; in steps 306-307, the base station sends the downlink assignment or uplink authorization etc. to the RN on the R-PDCCH and performs communication with the RN on the R-PDSCH/R-PUSCH.

In Embodiment 3, the time-frequency resources for the R-PDCCH can be transmitted by the special signaling, or by the MAC control element, or by the system information. The RN has received the time-frequency resources for the R-PDCCH before receiving the random access response message.

In Embodiment 3, the RN can acquire the switching time by the system information, which is the time interval from the moment when the random access response message is received in a receiving window to the moment of starting to monitor the R-PDCCH; or the RN can acquire the switching time by the special signaling, or by the random access response message, or by the MAC control element, which is the system frame number and/or sub-frame number of starting to monitor the R-PDCCH or the time interval. If the method for acquiring the switching time is different from the random access response message trigging the RN to monitor the R-PDCCH, the RN has acquired the switching time before receiving the random access response message.

In Embodiment 3, the uplink authorization information of the R-PUSCH and the is switching time are not indispensable. If they do not exist, the RN starts to monitor the R-PDCCH immediately after receiving the random access response message including an RN-dedicated indicating bit or RN-dedicated RAPID.

Embodiment 4

Figure 6:
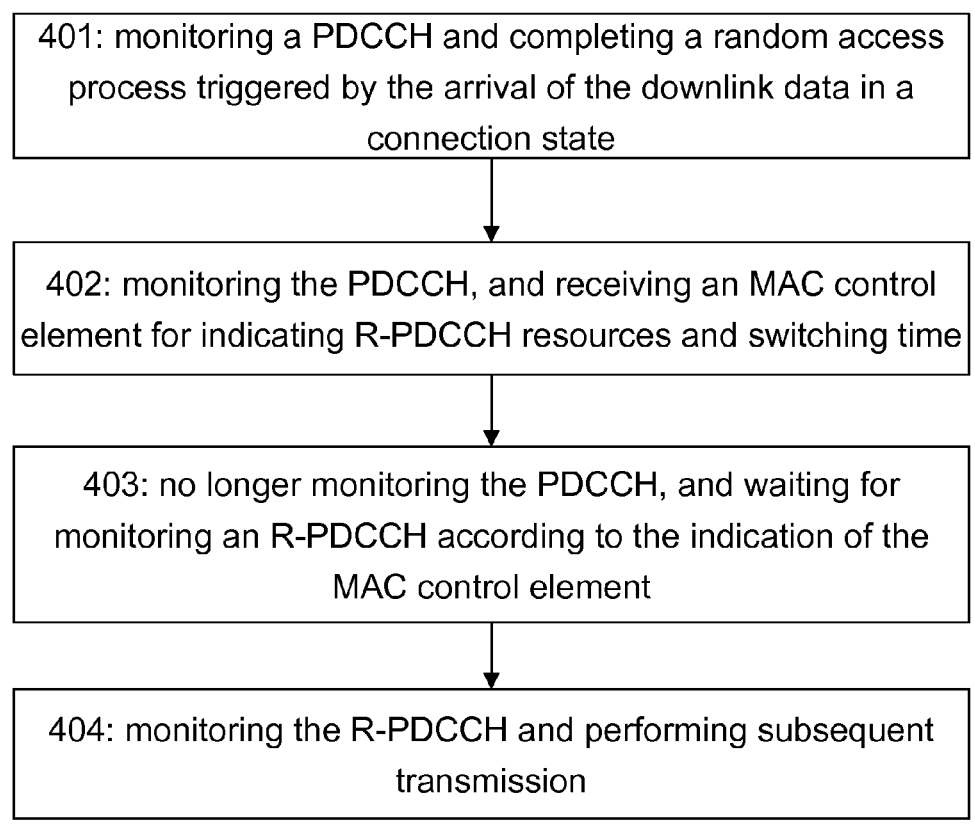
FIG. 6 shows a schematic diagram illustrating Embodiment 4 of the present disclosure.

After completing a random access process triggered by the arrival of downlink data in a connection through monitoring the PDCCH, the RN continues monitoring the PDCCH and performs corresponding uplink and downlink transmissions. When receiving an MAC control element including time-frequency resources for the R-PDCCH and the switching time, the RN acquires the time-frequency resources for the R-PDCCH and the switching time, and the RN is triggered to switch from monitoring the PDCCH to monitoring the R-PDCCH, starts to monitor the R-PDCCH from the predetermined switching time and performs the corresponding uplink and downlink transmissions. Taking FIG. 6 as an example, the process of the RN being switched from monitoring the PDCCH to monitoring the R-PDCCH is completed by the following steps:

step 401: the RN is in a connection state as UE, and the RN monitors the PDCCH and completes the random access process triggered by the arrival of the downlink data in a connection state; and go to step 402;

in the random access process triggered by the arrival of the downlink data in a connection state, the RN informs the base station that it is an RN itself by the MAC control element;

step 402: the RN monitors the PDCCH, receives an MAC PDU transmitted on the PDSCH according to the C-RNTI indication on the PDCCH, and acquires the MAC control element for indicating the time-frequency resources for the R-PDSCH and the switching time; and go to step 403;

step 403: the RN no longer monitors the PDCCH, and the RN switches to a connection state as an RN when the time for monitoring the R-PDCCH arrives; and go to step 404;

step 404: the RN is in a connection state as RN, monitors the R-PDCCH and performs communication on the R-PUSCH or R-PDSCH according to the C-RNTI indication on the R-PDCCH.

In steps 401-403, corresponding to the receiving and sending of the RN, the base station sends the downlink assignment or uplink authorization etc. to the RN on the PDCCH and performs communication with the RN on the PDSCH/PUSCH; in step 404, the base station sends the downlink assignment or uplink authorization etc. to the RN on the R-PDCCH, and performs communication with the RN on the R-PDSCH/R-PUSCH.

Embodiment 5

Figure 7:
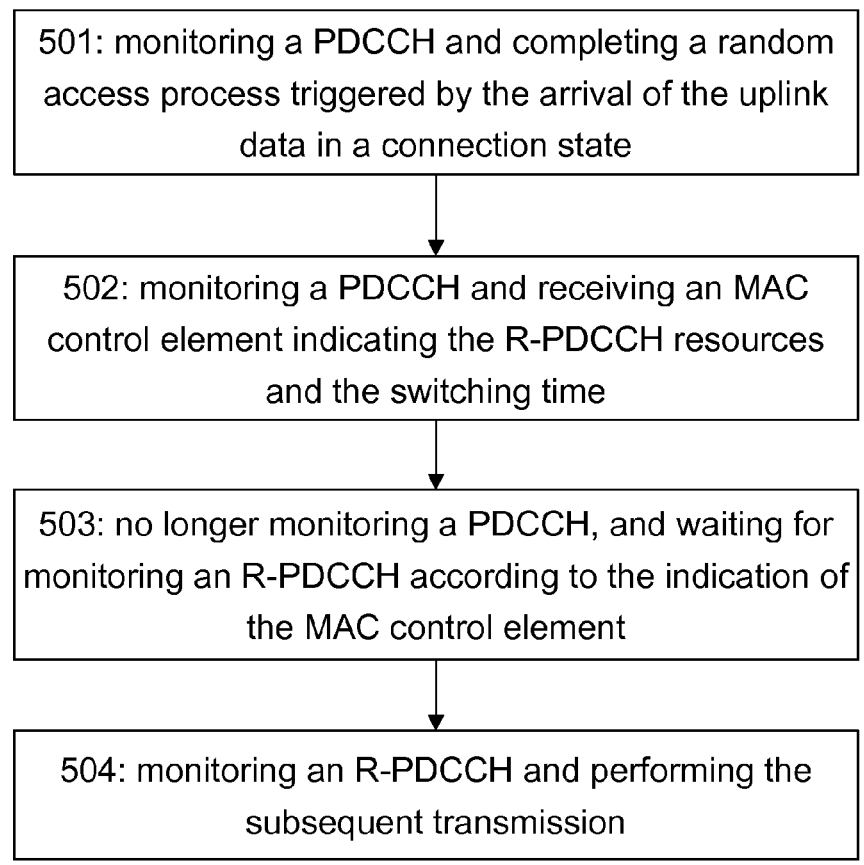
FIG. 7 shows a schematic diagram illustrating Embodiment 5 of the present disclosure.

After completing a random access process triggered by the arrival of uplink data in a connection through monitoring the PDCCH, the RN continues monitoring the PDCCH and performs corresponding uplink and downlink transmissions. When receiving an MAC control element including time-frequency resources for the R-PDCCH and the switching time, the RN acquires the time-frequency resources for the R-PDCCH and the switching time, and the RN is triggered to switch from monitoring the PDCCH to monitoring the R-PDCCH, starts to monitor the R-PDCCH from the predetermined switching time and performs the corresponding uplink and downlink transmission. Taking FIG. 7 as an example, the process of the RN being switched from monitoring the PDCCH to monitoring the R-PDCCH is completed by the following steps:

step 501: the RN is in a connection state as UE, and the RN monitors the PDCCH and completes the random access process triggered by the arrival of the uplink data in a connection state; and go to step 502;

in the random access process triggered by the arrival of the uplink data in a connection state, the RN informs the base station that it is an RN itself by the MAC control element;

step 502: the RN monitors the PDCCH, receives an MAC PDU transmitted on the PDSCH according to the C-RNTI indication on the PDCCH, and acquires the MAC control element for indicating the time-frequency resources for the R-PDSCH and the switching time; and go to step 503;

step 503: the RN no longer monitors the PDCCH, and the RN switches to a is connection state as an RN when the time for monitoring the R-PDCCH arrives; and go to step 504;

step 504: the RN is in a connection state as RN, monitors the R-PDCCH and performs communication on the R-PUSCH or R-PDSCH according to C-RNTI indication on the R-PDCCH.

In steps 501-503, corresponding to the receiving and sending of the RN, the base station sends the downlink assignment or uplink authorization etc. to the RN on the PDCCH and performs communication with the RN on the PDSCH/PUSCH; in step 504, the base station sends the downlink assignment or uplink authorization etc. to the RN on the R-PDCCH and performs communication with the RN on the R-PDSCH/R-PUSCH.

In Embodiment 4 and Embodiment 5, the MAC control element to trigger the RN to monitor the R-PDCCH can be a newly-introduced MAC control element;

in Embodiment 4 and Embodiment 5, the MAC control element to trigger the RN to monitor the R-PDCCH may be the same as or different from the MAC control element for transmitting the time-frequency resources for the R-PDCCH;

in Embodiment 4 and Embodiment 5, the MAC control element to trigger the RN to monitor the R-PDCCH may be the same as or different from the MAC control element for transmitting the switching time;

in Embodiment 4 and Embodiment 5, the time-frequency resources for the R-PDCCH can be transmitted by the MAC control element, or by the special signaling, or by system information. If the method for acquiring the time-frequency resources for the R-PDCCH is different from the method for the MAC control element triggering the RN to monitor the R-PDCCH, the RN has received the time-frequency resources for the R-PDCCH before receiving the MAC control element.

In Embodiment 4 and Embodiment 5, the RN can acquire the switching time by the system information, which is the time interval from the moment of the RN notifying the base station that the MAC control element is received successfully to the moment of starting to monitor the R-PDCCH; or the RN can acquire the switching time by the special signaling, which is the system frame number and/or sub-frame number from which the RN starts to monitor the R-PDCCH or the time interval. If the method for acquiring the switching time is different from the method for the MAC control element triggering the RN to monitor the R-PDCCH, the RN has received the switching time before receiving the MAC control element.

In Embodiment 4 and Embodiment 5, the switching time is not indispensable. If there is no switching time, the RN immediately starts to monitor the R-PDCCH immediately after receiving a newly-introduced MAC control element.

In the aforementioned five embodiments, the RN acquires the time-frequency resources for the R-PDCCH by the system information, or by the special signaling, or by the MAC control element;

the system information is formed by adding a field indicating the time-frequency resources for the R-PDCCH to the current system information, or by introducing new system information for transmitting the time-frequency resources for the R-PDCCH;

the special signaling is the appointed UE-dedicated signaling or the appointed RN-dedicated signaling, and can be formed by adding a field indicating the time-frequency resources for the R-PDCCH to the current special signaling, or by introducing new system information for transmitting the time-frequency resources for the R-PDCCH;

the MAC control element is a newly-introduced MAC control element for transmitting the time-frequency resources for the R-PDCCH.

In the aforementioned five embodiments, the RN acquires the switching time for switching from monitoring the PDCCH to monitoring the R-PDCCH by the system information, or by the special signaling, or by the MAC control element.

The system information is formed by adding a field indicating the switching time to the current system information, or by introducing new system information for transmitting the switching time;

the special signaling is the appointed UE-dedicated signaling or the appointed is RN-dedicated signaling, and can be formed by adding a field indicating the switching time to the current special signaling or by introducing new system information for transmitting the switching time;

the MAC control element is a newly-introduced MAC control element for transmitting the switching time;

the switching time can be the system frame number and/or sub-frame number, wherein the RN starts to monitor the R-PDCCH from the system frame number and/or sub-frame number; the switching time can also be the time interval from the moment when the downlink message for triggering the RN to switch to monitor the R-PDCCH is correctly received to the moment when the RN starts to monitor the R-PDCCH. The RN starts to monitor the R-PDCCH at the moment jointly indicated by the moment when the triggered downlink message is correctly received and the time interval.

Further, the moment of correctly receiving the downlink message for triggering the RN to switch to monitor the R-PDCCH is the moment of the RN notifying the base station that the special signaling triggering the RN to monitor the R-PDCCH is successfully received, or the moment when the RN receives the random access response message triggering the RN to monitor the R-PDCCH in the receiving window, or the moment of the RN notifying the base station that the MAC control element triggering the RN to monitor the R-PDCCH is received successfully.

The special signaling for transmitting the time-frequency resources for the R-PDCCH can be the same as or different from the special signaling for transmitting the switching time; the MAC control element for transmitting the time-frequency resources for the R-PDCCH can be the same as or different from the MAC control element for transmitting the switching time.

Of course, the present disclosure may have a variety of other embodiments. Various corresponding changes and transformations, without departing from the essence and spirit of the present disclosure, can be made by those skilled in the art. Such changes and transformations should be within the protection scope of the claims of the is present disclosure.

INDUSTRIAL APPLICABILITY

By applying the present disclosure, the RN is switched from monitoring the PDCCH to monitoring the R-PDCCH to enable the RN to switch from performing the transmitting according to the indication on the PDCCH to performing the transmitting according to the indication on the R-PDCCH, that is, the RN switches from being in a connection state as UE to being in a connection state as an RN. The present disclosure makes less change to the existing flows, offering advantages of easy implementation, and flexible configuration.

What is claimed is:

1. A method for Relay Node (RN) access, comprising:
a base station sending a downlink message to trigger an RN to switch from monitoring a Physical Downlink Control Channel (PDCCH) to monitoring an RN-dedicated Physical Downlink Control Channel (R-PDCCH); and
the RN acquiring time-frequency resources for the R-PDCCH from the base station before or while receiving the downlink message;
wherein the downlink message is special signaling including RN-dedicated configuration information, or an MAC control element including RN-dedicated configuration information;

wherein the special signaling including the RN-dedicated configuration information is an RRC connection reconfiguration message or newly-introduced special signaling;

the MAC control element including the RN-dedicated configuration information is a newly-introduced MAC control element; and wherein the RN-dedicated configuration information further comprises: switching time of switching from monitoring the PDCCH to monitoring the R-PDCCH;

the method further comprises: the RN acquires the switching time from the received downlink message and switches from monitoring the PDCCH to monitoring the R-PDCCH according to the switching time.

2. The method according to claim 1, wherein the RN is in a connection state as User Equipment (UE) when monitoring the PDCCH; wherein the RN has part of the functions or all functions of the UE in a connection state, but does not have a relay function to perform data transmission between the RN and the base station, and between the RN and the UE managed by this RN; and the RN is in a connection state as an RN when monitoring the R-PDCCH; at the moment, the RN has a relay function to perform data transmission between the RN and the base station, and between the RN and the UE managed by this RN.

3. The method according to claim 1, the method further comprising:

before the base station sends the downlink message to the RN, the base station identifying the RN by static configuration, or by receiving special signaling including an RN identification sent by the RN, or by a Media Access Control (MAC) control element including an RN identification sent by the RN.

4. The method according to claim 3, wherein the special signaling including the RN identification is: a Radio Resource Control (RRC) connection setup request message, an RRC connection setup complete message, an RRC connection reestablishment request message, an RRC connection reestablishment complete message, an RRC connection reconfiguration complete message, or newly-introduced special signaling; and the MAC control element including the RN identification is: a cell-radio network temporary identification MAC control element or a newly-introduced MAC control element.

5. The method according to claim 1, wherein the RN-dedicated configuration information comprises the time-frequency resources for the R-PDCCH;

the step that the RN acquires the time-frequency resources for the R-PDCCH from the base station comprises that: the RN acquires the time-frequency resources for the R-PDCCH from a received downlink message.

6. The method according to claim 5, the method further comprising:

the RN immediately starting to monitor the R-PDCCH after the RN acquires the time-frequency resources for the R-PDCCH from the base station.

7. The method according to claim 6, wherein the switching time is a system frame number and/or a sub-frame number from which the RN starts to monitor the R-PDCCH, or the switching time is a time interval from the moment when the downlink message is correctly received to the moment when the RN starts to monitor the R-PDCCH.

8. The method according to claim 7, wherein the step of switching from monitoring the PDCCH to monitoring the R-PDCCH according to the switching time comprises:

when the downlink message is the special signaling, the RN starts to monitor the R-PDCCH from the system frame number and/or sub-frame number; and when the downlink message is the MAC control element, the RN starts to monitor the R-PDCCH from the system frame number and/or sub-frame number, or determines the time to start to monitor the R-PDCCH according to the moment of the RN notifying the base station that the MAC control element is received successfully and the time interval.

9. A relay node, comprising: a message receiving module, a time-frequency resources acquiring module and a switching module; wherein the message receiving module is configured to receive a downlink message sent by a base station and trigger the switching module;

the time-frequency resources acquiring module acquires time-frequency resources for an R-PDCCH from the base station; and the switching module is configured to switch the RN from monitoring a PDCCH to monitoring the R-PDCCH;

wherein the downlink message is special signaling including RN-dedicated configuration information, or an MAC control element including RN-dedicated configuration information;

wherein the special signaling including the RN-dedicated configuration information is an RRC connection reconfiguration message or newly-introduced special signaling; and the MAC control element including the RN-dedicated configuration information is a newly-introduced MAC control element; and wherein the switching module is configured to start to monitor the R-PDCCH as soon as the time-frequency resources acquiring module acquires the time-frequency resources, or acquire the switching time from the downlink message and switch the RN from monitoring the PDCCH to monitoring the R-PDCCH according to the switching time.

10. The RN according to claim 9, wherein the time-frequency resources acquiring module is configured to acquire the time-frequency resources for the R-PDCCH from the downlink message.

* * * * *